UNITED STATES PATENT OFFICE 2,615,853

METHOD OF BREAKING WATER-IN-OIL EMULSIONS

Willard H. Kirkpatrick, Sugar Land, Tex., and John W. Ryznar, La Grange Park, Ill., assignors to Visco Products Company, Houston, Tex., a corporation of Delaware No Drawing. Application November 4, 1948, Serial No. 58,354

8 Claims. (Cl. 252—331)

This invention relates in particular to the treatment of emulsions of mineral oil and water, such as petroleum emulsions commonly encountered in the production, handling and refining of crude mineral oil, for the purpose of separating the oil from the water. Also the invention relates to the treatment of other water-in-oil type of emulsions wherein the emulsions are produced artificially or naturally and the resolution of the emulsions presents a problem of recovery or disposal.

Petroleum emulsions are in general of the water-in-oil type wherein the oil acts as a continuous phase for the dispersal of finely divided particles of naturally occurring waters or brines. These emulsions are often extremely stable and will not resolve on long standing. It is to be understood that water-in-oil emulsions may occur artificially resulting from any one or more of numerous operations encountered in various industries. The emulsions obtained from producing wells and from the bottom of crude oil storage tanks are commonly referred to as "cut oil," "emulsified oil," "bottom settlings," and "B. S."

One object of this invention is to provide a novel and economical process for resolving emulsions of the character referred to into their component parts of oil and water or brine.

Another object is to provide a novel reagent which is water wettable, interfacial and surface-active in order to enable its use as a demulsifier or for such uses where surface-active characteristics are necessary or desirable.

This process involves subjecting an emulsion of the water-in-oil type to the action of a demulsifying agent of the kind hereinafter described, thereby causing the emulsion to resolve and stratify into its component parts of oil and water or brine after the emulsion has been allowed to stand in a relatively quiescent state.

The treating agent employed in accordance with the present invention is a high molecular weight monoether of a polyoxyalkylene glycol.

In accordance with this invention, it has now been discovered that there is a series of compounds, which may be broadly designated as high molecular weight monoethers of polyoxyalkylene glycols, that are very effective when used as demulsifying agents for water-in-oil emulsions.

The preferred ether alcohols employed in the practice of this invention may be represented by the structural formula

wherein R is a hydrocarbon radical, $n$ is at least 2 and may have more than one value in a given molecule, and $x$ is an integer of such value that the average molecular weight of the composition, excluding R, exceeds 1500. Such compounds are thus seen to include monoethers of polyoxyalkylene glycols including polyoxyethylene glycols, polyoxypropylene glycols and polyoxyalkylene glycols in which the alkylene groups include both ethylene and propylene in any proportion and in an alternate, random or irregular sequence, with respect to each other, in the polyoxyalkylene chain.

In order that these monoethers of polyoxyalkylene glycols possess the property of efficiently breaking petroleum emulsions, they should be of relatively high molecular weight. Generally stated, it may be said that the ether alcohols employed for the purpose of this invention may be characterized as having a total average molecular weight of at least 1500, exclusive of the radical R in the foregoing formula, and containing a polyoxyalkylene group having different terminal groups connected to different terminal carbon atoms, one of said terminal groups being a hydroxy group and the other being an ether group. The demulsifying compounds employed for the purpose of the invention may also be described as being non-ionic in that they do not ionize to yield organic cations or organic anions.

Although, as will be described more fully hereinafter, the ether alcohols employed in accordance with this invention may be prepared by a variety of synthetic routes, and from a variety of reactants, the group attached to the terminal ether oxygen may be considered as derived from a monohydroxy alcohol or a monobasic phenol. Suitable alcohols and phenols are the simple alkanols such as methanol, ethanol, propanol, isopropanol, the butanols up to higher members such as cetyl alcohol, octadecanol; alicyclic alcohols, e. g., cyclohexanol; phenols, e. g., phenol, cresol; and aralkyl alcohols, e. g., benzyl alcohol. Other suitable alcohols and phenols are the corresponding monohydroxy alcohols and monobasic phenols substituted in the hydrocarbon chain or the aromatic ring by groups not possessing acidic hydrogen, common examples of such substituents being halogeno (e. g., chlorine, bromine, iodine and fluorine), nitro, cyano, alkyl (e. g., methyl, ethyl and higher homologues), and alkoxy (e. g., methoxy, ethoxy and higher homologues) but not hydroxy, carboxy, or sulfonic groups containing ionizable hydrogen or salt-forming groups.

Specific examples of ethers of polyoxyalkylene glycols suitable for the practice of this invention include (1) "UCON lubricant 50-HB-660" which is the monobutyl ether of a mixed ethylene-propylene polyoxyalkylene glycol in which ethylene oxide and 1,2-propylene oxide are present in approximately a 1:1 ratio and the molecular weight averages about 1700; (2) "UCON lubricant 50-HB-3520" which is substantially the mono-butyl ether of a mixed ethylene-propylene polyoxyalkyline glycol in which the weight ratio of ethylene oxide to 1,2-propylene oxide is 1:1 and in which the total molecular weight of the butyl derivative is about 3500 or greater as determined by calculation from data obtained by the Method of Menzies and Wright (Journal American Chemical Society, volume 43, pp 2309 to 2314) and by acetyl determination and for which the viscosity at 100 degrees F. is 3520 Saybolt seconds (S. U. S.); (3) "UCON lubricant 50-HB-5100" which is similar to (2) except that it contains a greater number of alkylene oxide groups and its viscosity is 5100 S. U. S.; and (4) "UCON lubricant LB-1145" which is substantially the monobutyl either of a polyoxypropylene glycol of such size that the average molecular weight is approximately 3300 by the method of Menzies (Journal American Chemical Society, volume 32, pp. 1615-1624) and the viscosity at 100 degrees F. is 1145 S. U. S. (Saybolt Universal seconds).

The compounds employed in accordance with this invention may be prepared in several ways. Thus, the desired alkylene oxide (e. g., ethylene oxide or 1,2-propylene oxide) or mixture of oxides may be reacted with a monohydric alcohol. This reaction may be represented for the case of a single alkylene oxide by the equation

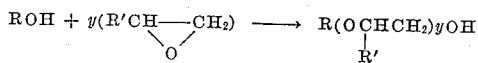

wherein ROH is an aliphatic monohydroxy alcohol, R' is H or CH₃, and y is a whole number. This is a well known type of reaction and has been described in U. S. Patent 1,633,927. For the case where a mixture of ethylene oxide and propylene oxide is used, the reaction may be represented by the equation

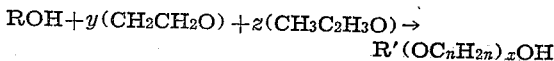

wherein ROH is an aliphatic monohydroxy alcohol; y and z represent the moles of ethylene oxide and 1,2-propylene oxide respectively; n is both 2 and 3 in a single molecule, the total number of times n has a value of 2 being equal to y and the total number of times n has a value of 3 being equal to z; and x is the total number of such oxyalkylene groups, being equal to y+z. Methods of effecting this reaction with the mixed oxides and the resultant compositions have been described in U. S. Patent 2,425,755. Certain modifications of this general reaction may be employed to produce compositions for the practice of the present invention, e. g., in place of the aliphatic monohydroxy alcohol (ROH), the alkylene oxide or mixed oxides may be reacted with a polyoxyalkylene monohydroxy alcohol prepared by this or some other route, to result in a product of the same chemical nature but of increased molecular weight because of the increased length of the polyoxyalkylene chain.

Another way in which the same class of products may be prepared is to effect the reaction of an alkyl or aryl halide with an alkali metal alcoholate. Much work on this general preparative scheme has been done by Hibbert and his co-workers (see e. g., Journal American Chemical Society, volume 61, p. 1905). The two equations given below illustrate the reaction involved.

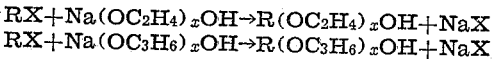

In these equations, R represents alkyl, aralkyl, aryl or cycloalkyl, x is a whole number, and X is halogen, e. g., chlorine or bromine. For convenience, polyoxyethylene glycols and polyoxypropylene glycols have been used for illustration, but it will be understood that polyoxyalkylene glycols containing both ethylene oxide and propylene oxide will undergo the same type of reaction.

Since, as indicated above, it is possible to prepare the ether alcohols of this invention by various routes, the invention should not be limited by the following examples, which are merely intended to illustrate some satisfactory procedures for preparing a few of the materials suitable for employment within the scope of the present invention.

*Example I*

A solution of sodium methylate in methanol is prepared by dissolving 4.6 grams (0.20 atom) of sodium in 150 milliliters of absolute methanol. To this is added 315 grams (0.21 mole) of a polyoxyethylene glycol of approximate average molecular weight 1500 and the methanol removed by distillation under reduced pressure. To the resulting mono-sodium salt of the glycol is added, at 80 to 110 degrees C. with stirring, 61 grams (0.20 mole) of cetyl bromide and the reaction mixture is stirred at this temperature for about 16 hours when a test for alkali to phenolphthalein is negative. The product is filtered hot to free it of sodium bromide. The product is substantially the monocetyl ether of the glycol.

*Example II*

Using the procedure of Example I and 1.5 grams of sodium, 150 milliliters of methanol, 97.5 grams of a polyoxyethylene glycol of average molecular weight 1500 and 13.9 grams of dodecyl chloride, a product consisting mainly of the monolauryl ether of the glycol is obtained.

*Example III*

Using the procedure of Example I and 0.46 grams of sodium, 150 milliliters of methanol, 84 grams of a polyoxyethylene glycol of average molecular weight 4000, and 6.7 grams of cetyl bromide, the monocetyl ether of the glycol is prepared.

*Example IV*

Using the procedure of Example I and 0.46 grams of sodium, 150 milliliters of methanol, 84 grams of the glycol of Example III, and 2.03 grams of butyl chloride, a product is obtained which is the monobutyl ether of the glycol.

*Example V*

Using the procedure of Example I and 0.86 gram of sodium, 250 milliliters of methanol, 240 grams of a polyoxypropylene glycol of average molecular weight 6000, and 12 grams of cetyl bromide, the monocetyl ether of the glycol is obtained.

Example VI

Using the procedure of Example I and 0.48 gram of sodium, 150 milliliters of methanol, 31 grams of a polyoxyethylene glycol of average molecular weight 1500, and 4.70 grams of iodobenzene, the monophenyl ether of the glycol is obtained.

Example VII

Using the procedure of Example I and 0.575 gram of sodium, 150 milliliters of methanol, 38 grams of a polyoxyethylene glycol of average molecular weight 1500, and 3.26 grams of cyclohexyl chloride, the monocyclohexyl ether of the glycol is obtained.

Example VIII

Using the procedure of Example I and 0.575 gram of sodium, 150 milliliters of methanol, 38 grams of a polyoxyethylene glycol of average molecular weight 1500, and 3.48 grams of benzyl chloride, the monobenzyl ether of the glycol is obtained.

By way of illustrating the remarkable effectiveness of the ether alcohols of this invention, the method of testing their efficiency in bottle tests will be described and exemplary data given, and this will be followed by the results of a full scale plant test.

Test I

Field bottle tests were made on samples of emulsified oil taken from the Ten Sections Field in California. A sample grind out showed that these emulsions contained about 23 parts of water per 100 parts of emulsion. The oil being treated in this field had a gravity of about 33° A. P. I. A gun barrel system was being used in the field and the oil was being treated at an approximate temperature of 110 degrees F. One hundred (100) cc. samples were taken and placed in conventional field test bottles. A test with another chemical which was being used to treat the oil indicated that about 0.07 cc. of a 10% solution of the treating chemical was required per 100 cc. of sample. In testing the composition of the present invention, the treatment employed was at the rate of one gallon of the treating chemical to 258 barrels of net oil, that is, oil after the removal of the water. The overall treating ratio was one gallon of treating chemical to 345 barrels of emulsified oil.

After the test chemical was added, the samples which were placed in the test bottles were shaken 200 times at atmospheric temperature and subsequently agitated an additional 100 times at treating temperature of 110 degrees F. After shaking in each instance the water drop was determined and recorded, that is to say, the amount of water which separated from the emulsion. The color of the oil was also observed and recorded at the same time. After agitating at elevated temperature the samples were maintained at 110 degrees F. to permit settling and stratification of the water.

The samples were secured just after the oil came from the well and every effort was made to maintain conditions comparable to those present in a full scale plant treatment. After agitation, the samples were allowed to settle and were tested for water drop at predetermined periods of time and recorded on suitable test sheets.

The test showed that when "UCON 50–HB–3520" was employed as the treating agent, 12 out of the 23 parts of water dropped out of the emulsion in 100 minutes and 20 parts dropped out after 180 minutes. When "UCON 50–HB–5100" was employed as the treating agent, 20 out of the 23 parts of water dropped out of the emulsion in 100 minutes and 21 out of the 23 parts of water dropped out in 180 minutes. The color of the oil in each instance was excellent. The samples were permitted to stand in a quiescent state for 2 hours and 10 minutes after the hot agitation and the oil was then subjected to what is known as a "thief grind out" test which showed that all of the water had separated. The results of these tests, therefore, were very satisfactory.

Test II

The test procedure was similar to that described in Test I except that the oil tested was taken from a well in the Hastings, Texas, field. The temperature of the test was 140 degrees F. The quantity of treating chemical employed was one gallon to 260 barrels of net oil. Among the treating chemicals employed were "UCON 50–HB–660," "UCON 50–HB–3520" and "UCON 50–HB–5100." The treatment with these chemicals dropped out substantially all of the water before hot agitation. The color of the oil was good. In this case the total amount of water present in the emulsified oil was 22 parts per 100 parts of emulsified oil.

Test III

The manner of testing was similar to that described in Test I except that the oil was taken from a field at Thompsons, Texas. The temperature of the test was air temperature. This field did not have the gun barrel type of system. The emulsion contained 64 parts of water per 100 parts of emulsion. The rate of treatment was one gallon of chemical to every 55 barrels of net oil. Tests were made with "UCON LB—1145," "UCON LB–613X," "UCON 50–HB–660," "UCON 50–HB–3520," and "UCON 50–HB–5100." All gave excellent color to the emulsion and clean oil. They gave a very loose web at the water-oil-interface. In this case the agitation was 200 shakes. With all of the aforementioned treating agents, about 5/6 or more of the water had separated after agitation and standing for 60 minutes. After standing for an additional 30 minutes, a substantially greater amount of the water had separated.

Test IV

This test was made on plant scale, that is, by treating the oil coming from the well in the plant system, in a field in Arkansas. A National heater treater was being used with a chemical proportioning pump to add the chemical treating agent.

The treating agent employed was made by dissolving 80 parts of "UCON–50–HB–660" in 120 parts of water at ordinary temperatures (75 degrees F.). The treatment was started about 5:40 p. m. and was observed until midnight. At 6:00 a. m. the next day the amount of treatment was reduced. Over a 3-hour interval, it was observed that the chemical consumption indicated about 3–4 gallons per 24 hours. Since the oil was being treated perfectly, it was decided to reduce the consumption and the chemical proportioning pump was set at about 9 strokes per minute (BS&B chemical pump). An hour and a half later the test indicated that the oil contained 0.2% free water which was not settling in the treater. After another hour and a half grind out tests were made which indicated that the treatment was leveling off with a consumption of about 2-2½ gallons of the treating agent per day as against 4 gallons of another treating agent previously employed in this plant system. A check the following day indicated that 2 gallons and 3 pints of the treating agent had been used during the previous 24 hours. The treating ratio was one gallon of chemical per 600 barrels of oil or a ratio of 1:25,000 in parts by weight. The treatment was continued and found to be very effective.

The "LB" compositions are monobutyl poly 1,2-oxypropylene glycols. The numbers following the letters designate the viscosity in Saybolt Universal seconds at 100 degrees F. In other words, as previously indicated, "UNCON lubricant LB-1145" is the monobutyl ether of a polyoxypropylene glycol having a viscosity at 100 degrees F. of 1145 S. U. S. (Saybolt Universal seconds).

The "UCON LB-613X" has a viscosity of 613 S. U. S. and contains an inhibitor. The average molecular weight of this material is about 1550.

The designation "HB" indicates that the composition contains a mixture of ethylene oxides and propylene oxides and the numeral in front of the "HB" indicates the relative proportions of these oxides in the mixture. All of the compounds in the "50-HB" series contain ethylene oxide and 1,2-propylene oxide in the approximate proportions of 1:1. The "50-HB-660" has a molecular weight of about 1700.

In general, the preferred compounds for the purpose of the invention have an average molecular weight within the range of 1500 to 7500, exclusive of the organic radical of the monoether group, and the best results have been obtained with the mixtures of monohydroxy oxyethylene oxy-1,2-propylene aliphatic monoethers in which ethylene oxide and 1,2-propylene oxide are combined therein as oxyethylene and oxy-1,2-propylene groups in a ratio which is at least ⅓ part, preferably in the range of ⅓ part to 9 parts, of 1,2-propylene oxide for each part of ethylene oxide by weight, the aliphatic monoethers of said mixture containing in a single molecule both the oxyethylene and the oxy-1,2-propylene groups.

The emulsifying compositions are preferably employed in the proportion of 1 part of reagent to from 2000 to 50,000 parts of emulsion, either by adding the concentrated product directly to the emulsion or after diluting with a suitable vehicle in the customary manner.

The invention is hereby claimed as follows:

1. A process of breaking water-in-oil emulsions which comprises treating such emulsions with an aliphatic ether alcohol characterized by a polyoxyalkylene group having different terminal groups connected to different carbon atoms, one of said terminal groups being a hydroxy group and the other being an ether group, said ether alcohol having a molecular weight of at least 1500, exclusive of the organic radical of the terminal ether group, and being free from ionizable acidic and salt-forming groups, the oxyalkylene groups in said ether alcohol being from the group consisting of oxyethylene and oxy-1,2-propylene groups and there being at least ⅓ part of 1,2-propylene oxide for each part of ethylene oxide by weight.

2. A process of breaking water-in-oil emulsions which comprises treating such emulsions with an aliphatic ether alcohol characterized by a polyoxyalkylene group having different terminal groups connected to different carbon atoms, one of said terminal groups being a hydroxy group and the other being an ether group, said ether alcohol having a molecular weight of 1500 to 7500, exclusive of the organic radical of the terminal ether group, and being free from ionizable acidic and salt-forming groups, and oxyalkylene groups in said ether alcohol being from the group consisting of oxyethylene and oxy-1,2-propylene groups and there being at least ⅓ part of 1,2-propylene oxide for each part of ethylene oxide by weight.

3. A process of breaking water-in-oil petroleum emulsions which comprises treating such emulsions with a compound having the structural formula $$R(OC_nH_{2n})_xOH$$

wherein R is an aliphatic hydrocarbon radical, $n$ is 3, $x$ is an integer of such value that the molecular weight is within the range of 1500 to 7500, exclusive of R.

4. A process of breaking water-in-oil petroleum emulsions which comprises treating such emulsions with mixtures of monohydroxy oxyethylene oxy-1,2-propylene aliphatic monoethers in which ethylene oxide and 1,2-propylene oxide are combined therein as oxyethylene and oxy-1,2-propylene groups in a ratio in the range of ⅓ part to 9 parts of 1,2-propylene oxide for each part of ethylene oxide by weight, the aliphatic monoethers of said mixture containing in a single molecule both the oxyethylene and the oxy-1,2-propylene groups and having an average molecular weight within the range of 1500 to 7500, exclusive of the organic radical of the monoether group.

5. A process of breaking water-in-oil petroleum emulsions which comprises treating such emulsions with mixtures of monohydroxy oxyethylene oxy-1,2-propylene monobutyl ethers in which ethylene oxide and 1,2-propylene oxide are combined therein as oxyethylene and oxy-1,2-propylene groups in a ratio in the range of ⅓ part to 9 parts of 1,2-propylene oxide for each part of ethylene oxide by weight, the monoethers of said mixture containing in a single molecule both the oxyethylene and the oxy-1,2-propylene groups and having an average molecular weight within the range of 1500 to 7500, exclusive of the monobutyl radical.

6. A process of breaking water-in-oil petroleum emulsions which comprises treating such emulsions with mixtures of monohydroxy oxyethylene oxy-1,2-propylene aliphatic monoethers in which ethylene oxide and 1,2-propylene oxide are combined therein as oxyethylene and oxy-1,2-propylene groups in a ratio in the approximate range of 1 part of 1,2-propylene oxide for each part of ethylene oxide by weight, the aliphatic monoethers of said mixture containing in a single molecule both the oxyethylene and the oxy-1,2-propylene groups and having an average molecular weight within the range of 1500 to 7500, exclusive of the organic radical of the monoether group.

7. A process of breaking water-in-oil emulsions which comprises treating such emulsions with a monoalkyl ether of a polyoxyalkylene glycol containing propylene oxide groups and ethylene oxide groups in approximately a 1:1 ratio and having a molecular weight within the range of 1500 to 7500, exclusive of the monoalkyl group.

8. A process of breaking water-in-oil emulsions which comprises treating such emulsions with a monobutyl ether of a polyoxyalkylene glycol containing 1,2-propylene oxide groups and ethylene oxide groups in approximately a 1:1 ratio and having a molecular weight within the range of 1500 to 7500, exclusive of the monobutyl group.

WILLARD H. KIRKPATRICK.
JOHN W. RYZNAR.

REFERENCES CITED

The following references are of record in the file of this patent:

UNITED STATES PATENTS

| Number | Name | Date |
|---|---|---|
| 2,233,383 | De Groote et al. | Feb. 25, 1941 |
| 2,243,330 | De Groote et al. | May 27, 1941 |
| 2,278,838 | De Groote et al. | Apr. 7, 1942 |
| 2,307,058 | Moeller | Jan. 5, 1943 |
| 2,317,726 | Boedeker et al. | Apr. 27, 1943 |
| 2,454,541 | Bock et al. | Nov. 23, 1948 |
| 2,527,970 | Sokol | Oct. 31, 1950 |